United States Patent
Kuiken

[15] 3,701,287
[45] Oct. 31, 1972

[54] TOOTHED GEARING
[72] Inventor: Hendrik Kuiken, Luttelgeest, Netherlands
[73] Assignee: U.S. Philips Corporation, New York, N.Y.
[22] Filed: Sept. 23, 1970
[21] Appl. No.: 74,571

[30] Foreign Application Priority Data
Oct. 2, 1969 Netherlands..............6914889

[52] U.S. Cl........................................74/462, 74/416
[51] Int. Cl. ..........................F16h 55/06, F16h 1/12
[58] Field of Search................................74/462, 416

[56] References Cited

UNITED STATES PATENTS 3,504,565    4/1970    Lichtenauer et al.....74/462 X

*Primary Examiner*—Leonard H. Gerin
*Attorney*—Frank R. Trifari

[57] ABSTRACT

For transmitting small power between rotating shafts having skew or intersecting axes, gearwheels having teeth each of which defines convex and concave involute curved blanks respectively for leading and trailing edges, the gearwheels being thin in the axial direction relative to the diameter.

5 Claims, 5 Drawing Figures

PATENTED OCT 31 1972

*INVENTOR.*
HENDRIK KUIKEN

BY

AGENT

PATENTED OCT 31 1972

*INVENTOR.*
HENDRIK KUIKEN

BY

AGENT 3,701,287

TOOTHED GEARING

BACKGROUND OF THE INVENTION

The invention relates to a toothed gearing in which the teeth of each of the co-operating gearwheels, in a cross-section taken in a plane at right angles to the axis of rotation of the wheel, have an involute tooth profile and a straight line of action associated with these involute profiles.

Involute teeth may be accurately made with simple tools and have the important advantage that they are insensitive to departures from the center distance in the case of parallel shafts. However, for shafts having intersecting or skew axes, complicated gearwheel constructions are required, such as bevel gearwheels, helical gearwheels and worm gears, the manufacture of which is laborious and expensive and which moreover require accurate relative adjustment.

SUMMARY OF THE NEW INVENTION

It is an object of the present invention to provide, for shafts having intersecting or skew axes and for the transmission of small powers, a simple gearing while retaining the advantages associated with the use of involute teeth; the invention is characterized in that the gearwheels used for a gearing which couples shafts having nonparallel axes in a position in which the aforementioned planes extending at right angles to the axes of rotation, intersect along a line in the direction of the line of action; also the teeth, at least at the involute profile line, have a small width at which, in theory, there will be a point contact between the co-operating tooth flanks which extends along the line of intersection of the planes.

In particular a gearing for shafts having intersecting axes is characterized in that the profile of each tooth in a section taken in a plane at right angles to the axis of rotation is constituted by a convex involute curve and a concave involute curve, the flank of a tooth having a convex involute curve of one gearwheel cooperating with a tooth flank having a concave involute curve of the other gearwheel.

BRIEF DESCRIPTION OF THE DRAWINGS

Embodiments of the invention will now be described by way of example, with reference to the accompanying diagrammatic drawings, in which.

DESCRIPTION OF THE PREFERRED EMBODIMENT

Figure 1:
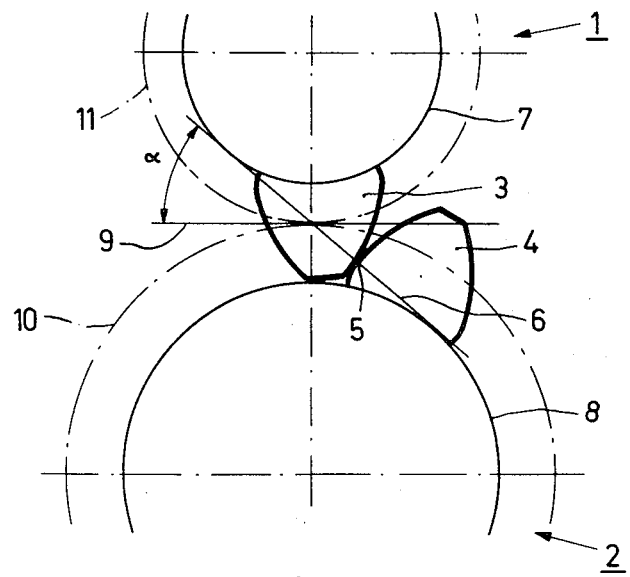
FIG. 1 shows schematically two gearwheels having involute teeth for a gearing which couples shafts having parallel axes.

Referring now to FIG. 1, a tooth 3 of a gearwheel 1 engages a tooth 4 of a gearwheel 2. For simplicity, only one tooth of each gearwheel is shown. During rotation of the gearwheels the point of contact 5 of the flanks of the teeth 3 and 4 moves along a straight line of action 6. This line of action 6 is tangent to the two base circles 7 and 8 and makes a pressure angle $\alpha$ with the tangent 9 to the two pitch circles 10 and 11.

The engagement of the two gearwheels is not changed if the wheels are relatively rotated about the line 6, assuming the gearwheels to have no width, i.e., no dimensions in the axial direction. Hence, in practice, the gearwheels are designed so as to have a small width relative to the dimensions of the teeth in the radial direction or the tooth flanks are suitably rounded in the direction of width or a combination of these steps is used. It should be noted that rounding in the direction of width in actual fact amounts to reducing the width of the tooth at the location of the involute tooth flank. Thus a gearing between shafts having in general skew axes is produced in which, in theory there will be point contact between the flanks. Such a gearing has all the advantages associated with involute teeth, such as a constant pressure angle and insensitivity to changes in the positions of the shafts, and it may be used for transmitting small powers. In principle rotation about the line of action 6 through any angle is possible.

Figure 2:
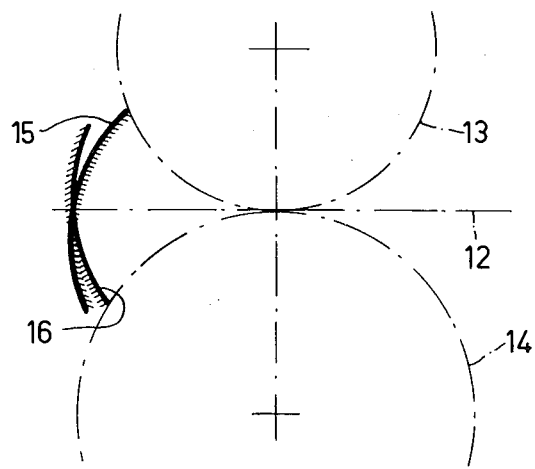
FIG. 2 shows a special case of a gearing of the kind shown in FIG. 1.

In particular, if the involutes of two tooth flanks lying opposite one another in one plane intersect, and the flanks can be used on one side only of this point of intersection when the gearing is used with shafts having parallel axes, rotation of one of the profiles about the line of action in the aforedescribed manner, i.e., with shafts having skew or intersecting axes, will still enable the entire involute profiles to be used on both sides of the point of intersection. FIG. 2 shows a case in which the line of action 12 is tangent to the two pitch circles 13 and 14, which now are base circles also. The two involute profiles 15 and 16 intersect along the entire line of action 12, so that they cannot be used at all for shafts having parallel axes. However, rotation about the line of action 12 allows these profiles to be used for shafts having intersecting axes, provided that in theory the contact between the flanks, viewed spatially, will be restricted to the points successively passed through on the line of action. For practical purposes this is sufficiently achieved by using a small width of the tooth or by suitable rounding off of the tooth flank as described hereinbefore.

Figure 3:
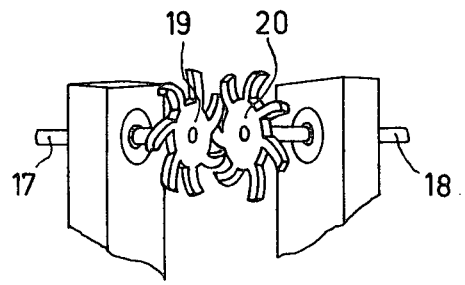
FIG. 3 is a schematic perspective view of a gearing for shafts having intersecting axes.
Figure 4:
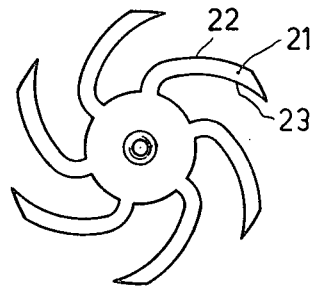
FIG. 4 is a front elevation of one of the gearwheels of FIG. 3.
Figure 5:
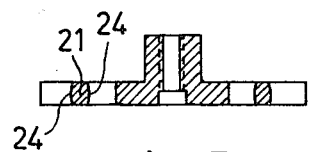
FIG. 5 is a sectional view of the gearwheel of FIG. 4.

FIG. 3 shows a gearing for shafts 17 and 18 having intersecting axes, gearwheels 19 and 20 of this gearing having a tooth profile which corresponds to the tooth flank curves of FIG. 2. As is shown most clearly by FIG. 4, each tooth 21 comprises a convex involute flank 22, which corresponds to the curve 15 of FIG. 2, and a concave involute flank 23, which corresponds to the curve 16 of FIG. 2. A section through a tooth as shown in FIG. 5 shows that the width of the teeth 21 measured in the axial direction is small relative to their height measured in the radial direction, so that gearwheels having a rectangular tooth section may be used. In addition, the teeth of the meshing wheels will run in with respect to one another, that is to say, they will adapt themselves to one another by wear, so that the contact between the flanks is improved.

In order to effect a better approximation to the theoretical point contact along the line of action on which the invention is based, tooth flanks 24 which are curved in the direction of width may be used, as is shown in FIG. 5, the curvature being such that only the flank line situated in a plane at right angles to the axis of rotation is in contact with the meshing gearwheel. In this case, obviously only this flank line must have the involute shape. In actual fact the theoretical point contact will not occur, but under the influence of the load the material of the teeth will be deformed at the point of contact so that the tooth flanks engage one another through a small area. Because the convex flank 22 is in contact with a concave flank, stress conditions are more favorable than in the case of contact between two convex flanks according to the theory of Hertz. The long curved tooth shape provides a sufficiently large contact ratio with a small number of teeth.

What is claimed is:

1. A gearing in which the teeth of each of the meshing gearwheels in a section by a plane at right angles to the axis of rotation of the gearwheel have an involute tooth profile, with a straight line of action associated with these involute profiles, characterized in that the gearwheels are used for coupling shafts having non-parallel axes in a position in which the said planes at right angles to the axes of rotation intersect along a line in the direction of the line of action, and at least at the location of the involute profile line the teeth have a small width, while in theory there will occur between the co-operating tooth flanks a point contact which moves along the line of intersection of the planes.

2. A gearing as claimed in claim 1, for shafts having intersection axes, characterized in that the profile of each tooth in a section by a plane at right angles to the axis of rotation comprises a convexly involute curve and a concavely involute curve, a tooth flank having a convexly involute curve of one wheel co-operating with a tooth flank having a concavely involute curve of the other wheel.

3. A first gearwheel rotatable about a first axis and operable with a similar second gearwheel rotatable about a second axis non-parallel with the first axis, each wheel having teeth about its periphery which define a plane generally normal to its axis of rotation, each tooth having a profile which defines a convex involute leading edge and a concave involute trailing edge, said first gearwheel and said second wheel, when positioned for their teeth to be drivingly coupled, have said planes intersecting along a line in which is defined the line of action of the gears, and at least at the location of the involute profile line each tooth has width in the axial direction of the wheel that is thin relative to the tooth height in the radial direction of the wheel.

4. A pair of first and second co-operating gears rotatable about non-parallel axes, each wheel having teeth about its periphery which define a plane generally normal to its axis of rotation, the first gear's teeth each having a profile which defines an involute on at least one of the leading and trailing edges thereof, the second gear's teeth each having a profile which defines an involute on at least the other of said leading and trailing edges, said gears when positioned such that their teeth are drivingly coupled, having said planes intersecting along a line in which is defined the line of action of the gears, and at least at the location of the involute profile line each tooth has width in the axial direction of the wheel that is thin relative to the tooth height in the radial direction of the wheel.

5. Apparatus according to claim 4 wherein said teeth are evenly spaced on each wheel.

* * * * *